June 12, 1928.
W. B. MURDOCK
1,673,699
AUXILIARY WINDSHIELD CLEANER
Filed Sept. 30, 1927
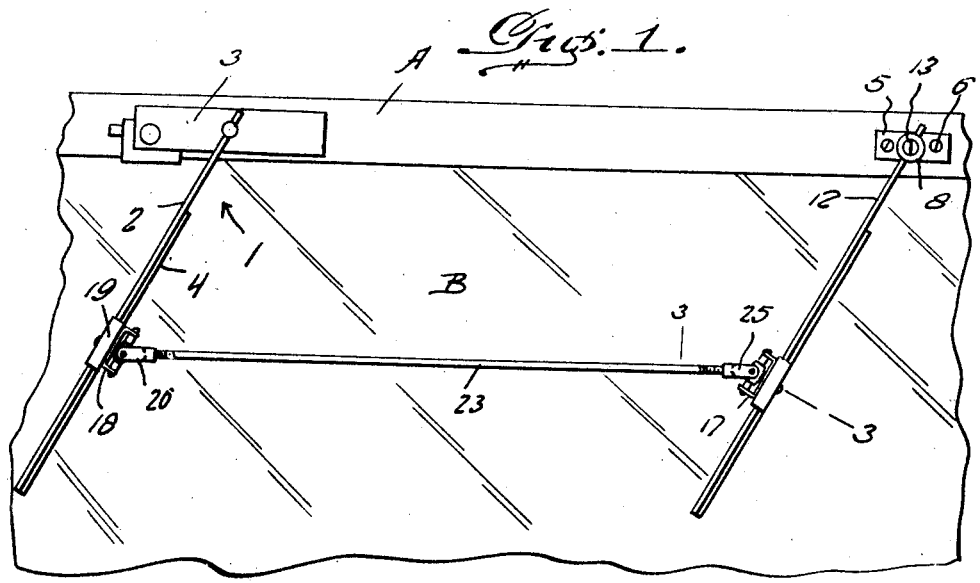
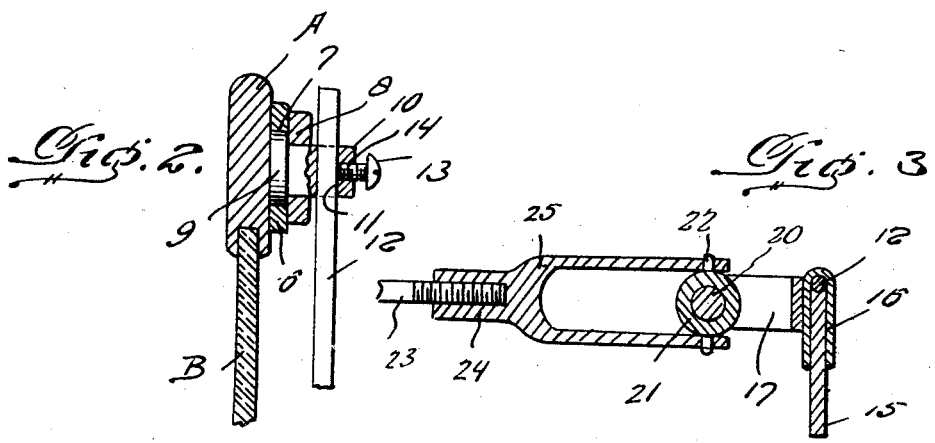
Inventor
W. B. Murdock,
By Clarence A. O'Brien
Attorney Patented June 12, 1928.

1,673,699

UNITED STATES PATENT OFFICE.

WALTER B. MURDOCK, OF AUBURN, NEW YORK.

AUXILIARY WINDSHIELD CLEANER.

Application filed September 30, 1927. Serial No. 223,103.

The present invention relates to improvements in automobile windshield cleaners and has reference more particularly to an auxiliary cleaner unit which is adapted to be operatively connected with a conventional automatic windshield cleaner whereby laterally spaced areas of the windshield pane may be cleaned simultaneously.

Another important object of the invention is to provide an auxiliary windshield cleaner which may be readily and easily attached to the windshield frame and also connected to the pivoted wiper arm of the conventional automatic windshield cleaner without necessitating any material alterations of the parts with which the present invention is to be associated, and which auxiliary cleaner will at all times be positive and efficient in its operation.

A still further object is to provide an auxiliary windshield cleaner of the above mentioned character which is simple in construction, inexpensive, strong and durable and further well adapted to the purpose for which it is designed.

In the accompanying drawing forming part of this application and in which like numerals indicate like parts:

Figure 1 is a front elevation of my improved auxiliary windshield cleaner showing the same attached to a windshield frame and connected to the pivoted wiper arm of a conventional automatic windshield cleaner.

Figure 2 is a view partly in elevation and partly in section of the connection between the upper end of the wiper arm of my auxiliary windshield cleaner and the frame of the windshield, and Figure 3 is a sectional view taken substantially on the line 3—3 of Figure 1.

In the drawing wherein for the purpose of illustration is shown the preferred embodiment of my invention, the numeral 1 designates generally an automatic windshield cleaner of the conventional construction, the same including a wiper arm 2 which is operatively connected at its upper end to suitable operating mechanism arranged within the housing 3 which is secured on the upper horizontal frame A of an automobile windshield. This arm 2 carries the usual windshield pane engaging wiper 4 which is in the form of a rubber strip and as is customary, this windshield cleaner 1 is located on the windshield frame in such a manner as to cover the area on the pane B directly in front of the operator of the vehicle.

My improved auxiliary cleaner is adapted to cover an area spaced laterally from the area covered by the conventional windshield cleaner 1 so that the major portion of the upper half of the windshield may be kept clean for the purpose of permitting the operator of the vehicle to have a clear vision through the windshield. The auxiliary cleaner embodying my invention comprises a substantially rectangular plate 5 which is secured on the front side of the upper portion of the frame A of the windshield by any appropriate fastening means such as is shown at 6, and this plate is formed with an enlarged central opening 7 which is more clearly illustrated in Figure 2. A collar 8 is secured on the front face of this plate 6 in any appropriate manner and the bore of this collar is smaller than the diameter of the opening 7 formed in the plate 6. The purpose of this collar is to provide a means for retaining the flanged portion 9 of the stub shaft 10 which stub shaft extends through the collar. The flanged portion 9 is adapted for disposition within the opening 7 formed in the plate 6 and is free to rotate therein.

This stub shaft 10 is formed with a transverse bore 11 in its outer end portion through which is slidable the upper end of the wiper arm 12 and for the purpose of adjustably securing the upper end of this wiper arm in the bore, I provide the set screw 13 the same being threaded through a threaded opening 14 provided therefor in the outer end of the stub shaft 10, and which threaded opening communicates with the transverse bore 11 so that the inner end of the set screw will engage the upper end of the arm and frictionally hold the wiper arm in its properly adjusted position with respect to the stub shaft.

A windshield pane engaging wiper 15 which is in the form of a rubber strip is secured to the lower end portion of the arm 12 by the clamp 16. The connecting means between the arm 2 of the conventional windshield cleaner 1 and the arm 12 of my auxiliary windshield cleaner will now be specifically described.

A substantially U-shaped bracket 17 is secured to the clamp 16 carried by the arm 12 of the auxiliary windshield cleaner, a similar bracket 18 being carried by the clamp 19 which is associated with the wiper arm 2 for attaching the wiper 4 to said arm. A substantially vertically disposed pin 20 extends through suitable registering openings provided therefor in the outer ends of the arms of each of the U-shaped brackets and carried by the intermediate portion of each of these pins is the sleeve 21, the same being formed at diametrically opposite points with the laterally extending pintles 22. This construction is more clearly disclosed in Figure 3 of the drawing.

An elongated rod 23 is threaded at its respective ends and one end of this rod is threaded into a suitable socket provided therefor in the shank portion 24 of a yoke 25, the end portions of the arms of which are disposed on opposite sides of the sleeve 21 carried by the pin arranged in the bracket 17 and the free ends of the arms of this yoke are formed with openings to receive the respective laterally extending pintles 22 whereby to afford a connection between the yoke and the rotatable rod 20 which is journaled for rotation between the arms of the U-shaped bracket 17.

The other threaded end of this rod 23 is threaded into a similar socket formed in the shank portion of a yoke 26 which is identical with the yoke 25 and the free ends of the arms of this yoke 26 are disposed on opposite sides of the pin which is rotatably mounted between the arms of the U-shaped bracket 18 carried by the wiper arm 2 and the laterally projecting pintles carried by the sleeve which is associated with the last mentioned pin have their ends also extending through openings formed in the free end portions of the arms of the yoke 26, in the manner clearly illustrated in Figure 1. When the parts are connected in the manner as above described and as fully illustrated in Figure 1, it will readily be obvious that when the conventionally automatically operated windshield wiper 1 is in operation, said connecting means will effect the simultaneous operation of my auxiliary windshield cleaner whereby to clean an area which is spaced laterally from the area cleaned by the wiper of the windshield wiper 1, and in this manner, the major portion of the upper half of the windshield pane B will be kept clean. The attachment of my auxiliary windshield cleaner will provide what may be termed as a duplex or tandem windshield cleaner, and due to its simplicity, the auxiliary cleaner may be readily and easily attached without necessitating any material alterations of the parts of the conventional automatic windshield cleaners now in use.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination with a windshield cleaner including a swinging wiper arm, an auxiliary windshield cleaner adapted to clean an area of the windshield pane that is spaced laterally from the first mentioned cleaner, said auxiliary cleaner including a wiper arm pivotally secured at its upper end to the top of the windshield frame, a wiper attached to said arm, opposed brackets carried by the wiper arms, a vertical pin journaled for rotation in each bracket, diametrically opposed pintles extending laterally from the intermediate portion of each pin, a pair of yokes, said pintles extending through openings provided therefor in the outer ends of the arms of the respective yokes, and a connecting rod between said yokes.

In testimony whereof I affix my signature.

WALTER B. MURDOCK.